United States Patent
Luo et al.

(10) Patent No.: US 12,470,249 B2
(45) Date of Patent: Nov. 11, 2025

(54) WIRELESS COMMUNICATION CIRCUIT AND TRANSPORT DEVICE FOR SENDING RESCUE MESSAGE

(71) Applicant: Wistron NeWeb Corp., Hsinchu (TW)

(72) Inventors: Jun Feng Luo, Hsinchu (TW); Su Wei, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 297 days.

(21) Appl. No.: 18/487,316

(22) Filed: Oct. 16, 2023

(65) Prior Publication Data

US 2024/0154641 A1    May 9, 2024

(30) Foreign Application Priority Data

Nov. 9, 2022 (CN) .......................... 202211399219.4

(51) Int. Cl.
*H04B 1/44*    (2006.01)

(52) U.S. Cl.
CPC ..................... *H04B 1/44* (2013.01)

(58) Field of Classification Search
CPC ............. H04W 4/90; H04B 1/40; H04B 1/44
See application file for complete search history.

(56) References Cited

U.S. PATENT DOCUMENTS

| | | | |
|---|---|---|---|
| 6,154,658 A * | 11/2000 | Caci | H04M 11/04 |
| | | | 455/66.1 |
| 2010/0234071 A1 * | 9/2010 | Shabtay | H04B 7/155 |
| | | | 455/562.1 |
| 2013/0149985 A1 * | 6/2013 | Yi | H04W 76/50 |
| | | | 455/404.1 |
| 2017/0099686 A1 * | 4/2017 | Green | H04L 5/14 |
| 2018/0132154 A1 | 5/2018 | Sirotkin et al. | |
| 2021/0258051 A1 * | 8/2021 | Ju | H04B 7/061 |
| 2022/0085766 A1 | 3/2022 | Balteanu et al. | |
| 2022/0158693 A1 * | 5/2022 | Nakata | H04B 7/0473 |
| 2022/0297699 A1 * | 9/2022 | Kim | H04W 4/06 |
| 2023/0015565 A1 * | 1/2023 | Khesbak | H04B 1/40 |
| 2023/0023478 A1 * | 1/2023 | Hwang | H04W 76/50 |

* cited by examiner

*Primary Examiner* — David Bilodeau
(74) *Attorney, Agent, or Firm* — McClure, Qualey & Rodack, LLP

(57) ABSTRACT

A wireless communication circuit and a transport device for sending rescue message are provided. The wireless communication circuit is arranged in a transport device for sending a rescue message to a cellular network and includes a radio transceiver, a signal amplifier circuit, a plurality of filters, and a first switch. The radio transceiver converts a baseband signal to a radio frequency signal and determines whether the cellular network has been connected. The first switch includes an input end and a plurality of output ends, and is electrically connected between the signal amplifier circuit and the plurality of filters. The first switch connects the input end and one of the plurality of output ends in sequence until the radio transceiver determines the cellular network has been connected. The wireless radio transceiver sends the rescue message through the first switch.

16 Claims, 2 Drawing Sheets

WIRELESS COMMUNICATION CIRCUIT AND TRANSPORT DEVICE FOR SENDING RESCUE MESSAGE

CROSS-REFERENCE TO RELATED PATENT APPLICATION

This application claims the benefit of priority to China Patent Application No. 202211399219.4, filed on Nov. 9, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly, to a wireless communication circuit and a transport device that send rescue messages.

BACKGROUND OF THE DISCLOSURE

With the popularization of transportation devices such as cars, the probability of car accidents also increases. It is crucial for every driver and passenger to quickly receive assistance after a car accident. Although most cars are equipped with an onboard SOS rescue system, the number of antennas on the car is relatively small. If a car experiences a severe collision and the main antenna happens to be damaged, then the onboard SOS rescue system will be useless and it could be fatal for the injured person.

SUMMARY OF THE DISCLOSURE

It is an object of the present disclosure to provide a wireless communication circuit that is suitable to be arranged in a transport device and includes a radio transceiver, a signal amplifier circuit, a plurality of filters, and a first switch. The radio transceiver converts a baseband signal to a radio frequency signal and determines whether a cellular network has been connected. The signal amplifier circuit is electrically connected to the radio transceiver for amplifying the radio frequency signal. The plurality of filters filter the radio frequency signal. The first switch includes an input end and a plurality of output ends and is connected between the signal amplifier circuit and the plurality of filters. The first switch connects the input end and one of the plurality of output ends in sequence until the radio transceiver determines the cellular network has been connected. The radio transceiver sends the rescue message through the first switch.

It is another object of the present disclosure to provide a transport device, which includes a radio transceiver, a signal amplifier circuit, a plurality of filters, a first switch, a second switch, a plurality of radio frequency antennas, a sensor unit, and a microcontroller. The radio transceiver converts a baseband signal to a radio frequency signal and determines whether a cellular network has been connected. The signal amplifier circuit is electrically connected to the radio transceiver and amplifies the radio frequency signal. The plurality of filters filter the radio frequency signal. The first switch includes an input end and a plurality of output ends. The first switch is electrically connected between the signal amplifier circuit and the plurality of filters. The second switch includes a second input end and a plurality of second output ends. The second input end is electrically connected to one of the plurality of filters. Some of the plurality of radio frequency antennas are electrically connected to the plurality of filters. Some of the plurality of radio frequency antennas are electrically connected to the plurality of second output ends of the second switch. The sensor unit senses whether the transport device is involved in a collision. The first switch connects the input end and one of the plurality of output ends in sequence until the radio transceiver determines that the cellular network has been connected. The radio transceiver sends a rescue message through the first switch and one of the plurality of radio frequency antennas. When the transport device is involved in a collision, the sensor unit sends a control signal to the microcontroller, and the microcontroller sends an activation command to the radio transceiver based on the control signal, so that the radio transceiver begins determining whether the cellular network has been connected.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
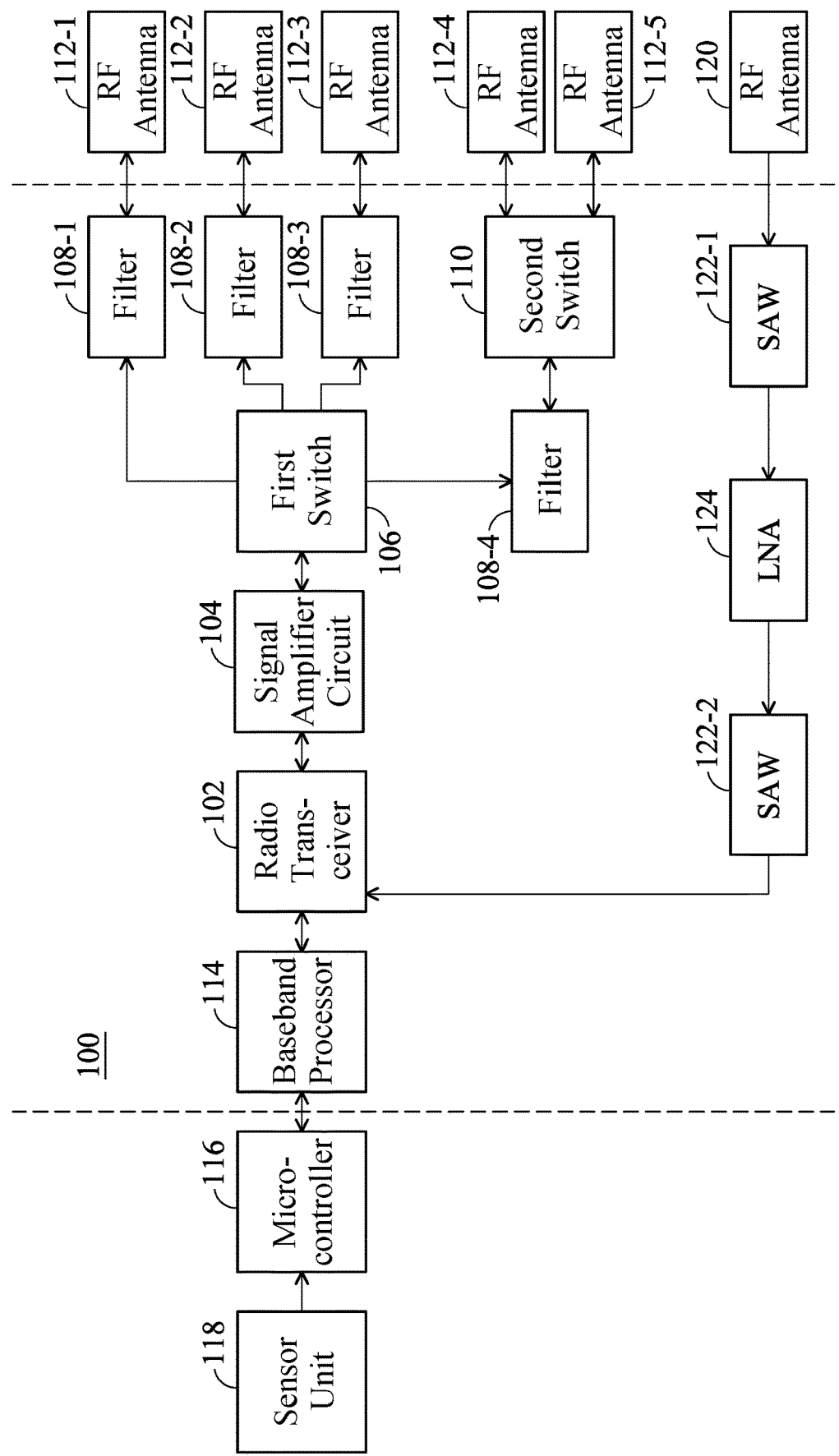
FIG. 1 is a schematic diagram of a wireless communication circuit 100 according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In some embodiment of the present disclosure, the term "couple", may include any direct and indirect means of electrical connection unless otherwise defined.

Referring to FIG. 1, a wireless communication circuit 100 includes a radio transceiver 102, a signal amplifier circuit 104, a first switch 106, a plurality of filters 108-1, 108-2, 108-3, 108-4, a second switch, a plurality of surface acoustic wave (SAW) filters 122-1, 122-2, a low noise amplifier (LNA) 124, and a baseband processor 114. In some embodiments, the radio transceiver 102 is electrically connected between the baseband processor 114 and the signal amplifier circuit 104. The radio transceiver 102 is used to convert a baseband signal from the baseband processor 114 to a radio frequency (RF) signal and transmit the RF signal through radio frequency (RF) antennas 112-1, 112-2, 112-3, 112-4, 112-5. Likewise, in some embodiments, the radio transceiver 102 is used to receive the RF signal and convert the received RF signal to the baseband signal for the baseband processor 114 to perform subsequent treatment. In some embodiments, the radio transceiver 102 is used to determine whether a cellular network has been connected, in other words, the radio transceiver 102 determines whether it is connected to the cellular network.

In some embodiments, the cellular network is a fifth-generation (5G) new radio network, but the present disclosure is not limited thereto. The radio transceiver 102 is connected to the cellular network through a base station, such as a gNB (gNodeB). In some embodiments, the radio transceiver 102 determines whether it is connected to the cellular network by receiving a confirmation command from the cellular network, but the present disclosure is not limited thereto. In some embodiments, the signal amplifier circuit 104 is electrically connected between the radio transceiver 102 and the first switch 106, and is used to amplify the RF signal. For example, the signal amplifier circuit 104 amplifies not only the RF signal output by the radio transceiver 102, but also the RF signal received by the RF antennas 112-1, 112-2, 112-3, 112-4, 112-5. In some embodiments, the signal amplifier circuit 104 is used to amplify RF signals within specific frequency band. For example, the signal amplifier circuit 104 can amplify RF signals in the low band (LB), mid-high band (MHB), or ultra-high band (UHB), but the present disclosure is not limited thereto.

In some embodiments, the first switch includes an input end and four output ends, but the present disclosure is not limited thereto. The first switch 106 is electrically connected between the signal amplifier circuit 104 and the plurality of filters. The input end of the first switch is electrically connected to the signal amplifier circuit 104, and the four output ends are electrically connected to the filters 108-1, 108-2, 108-3, 108-4, respectively. In some embodiments, the filter 108-1 is electrically connected between the first output end of the first switch 106 and the RF antenna 112-1, the filter 108-2 is electrically connected between the second output end of the first switch 106 and the RF antenna 112-2, the filter 108-3 is electrically connected between the third output end of the first switch 106 and the RF antenna 112-3, and the filter 108-4 is electrically connected between the first switch 106 and the second switch 110.

In some embodiments, the first switch 106 connects the input end with one of the output ends in sequence until the radio transceiver 102 determines that the cellular network is connected. For example, when the radio transceiver 102 begins to callout to the base station to establish connection, the first switch 106 connects the input end and the first output end first. In other words, the radio transceiver 102 first tries to connect to the cellular network through the RF antenna 112-1. When the radio transceiver 102 determines that connection to the cellular network cannot be established through the RF antenna 112-1, the first switch 106 subsequently connects the input end and the second output end. In other words, the radio transceiver 102 subsequently tries to connect to the cellular network through the RF antenna 112-2. When the radio transceiver 102 determines that it cannot connect to the cellular network through the RF antenna 112-2, the first switch then connects the input end and the third output end, so that the radio transceiver 102 can try to connect to the cellular network through the RF antenna 112-3. Thereafter, the first switch 106 connects its' input end and one of its' output ends until the radio transceiver 102 determines that the cellular network has been connected.

The second switch 110 has an input end and two output ends. The input end of the second switch 110 is electrically connected to the filter 108-4. The first end of the second switch 110 is electrically connected to the RF antenna 112-4, and the second end of the second switch 110 is electrically connected to the RF antenna 112-5. When the first switch 106 connects its input end and its fourth output end, the second switch 110 first connects its input end and its first output end. In other words, the radio transceiver tries to establish connection with the cellular network through the RF antenna 112-4 next. When the radio transceiver 102 determines that the cellular network cannot be connected through the RF antenna 112-4, the second switch 110 then connects its input end and its second output end so the radio transceiver 102 can continue to try to connect to the cellular network through the RF antenna 112-5. Subsequently, when the first switch 106 connects its input end and the one output end that is electrically connected to the filter 108-4, the second switch connects its input end and one of the output ends that are electrically connected to the RF antennas 112-4, 112-5 in sequence, until the radio transceiver 102 determined that the cellular network has been connected. In some embodiments, the wireless communication circuit 100 is installed in a transport device, like a vehicle or an automobile, but the present disclosure is not limited thereto. In addition, the RF antennas 112-1, 112-2, 112-3, 112-4, 112-5 are placed at different locations in the transport device.

For example, the RF antenna 112-1 is placed at the front bumper of the transport device, the RF antenna 112-2 is placed at the rear bumper of the transport device, the RF antenna 112-3 is placed at the left-side mirror, the RF antenna 112-4 is placed at the right-side mirror, the RF antenna 112-5 is placed on the hood of the transport device. The present disclosure does not limit the number of RF antennas. When there are more RF antennas, the radio transceiver 102 has a higher chance of connecting to the cellular network through one of the RF antennas by switching among them with the first switch 106 and the second switch 110, so the radio transceiver can send a rescue message through the first switch 106 and the RF antenna.

In some embodiments, the radio transceiver 102 receives a global navigation satellite system signal through an RF antenna 120 and decodes the global navigation satellite system signal to obtain a location information of the transport device. The RF antenna 120 is a positioning antenna but the present disclosure is not limited thereto. The radio transceiver 102 embeds the location information of the transport device in the rescue message and sends the rescue message. In some embodiments, the surface acoustic wave filter 122-1 is electrically connected between the low noise amplifier 124 and the RF antenna 120. The low noise amplifier 124 is electrically connected between the surface acoustic wave filter 122-1 and the surface acoustic wave filter 122-2. The surface acoustic wave filter 122-2 is electrically connected between the radio transceiver 102 and the low noise amplifier 124. The surface acoustic wave filters 122-1, 122-2 are used to filter the global navigation satellite system signal, and the low noise amplifier 124 is used to amplify the global navigation satellite system signal.

In some embodiments, the microcontroller 116 is installed in an on-board system of the transport device, but the present disclosure is not limited thereto. The sensor unit 118 is placed in the transport device but the present disclosure is not limited thereto. In some embodiments, when the transport device is involved in a collision, the sensor unit 118 transmits a control signal to the microcontroller 116, and the microcontroller 116 transmits an activation command based on the control signal to the radio transceiver 102. The radio transceiver 102 then begins to determine whether the cellular network has been connected.

Figure 2:
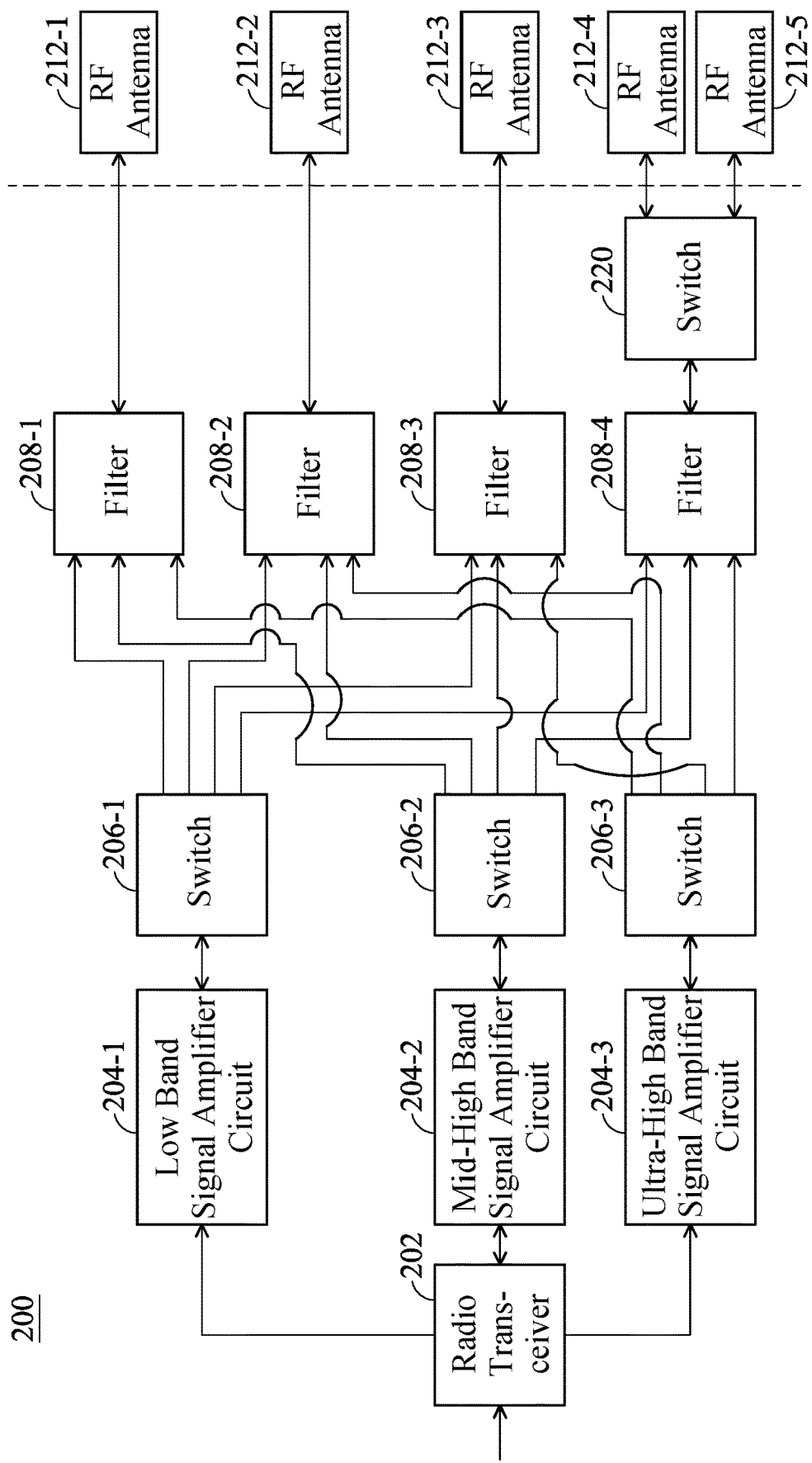
FIG. 2 is a schematic diagram of a wireless communication circuit 200 according to an embodiment of the present disclosure.

Referring to FIG. 2, a wireless communication circuit 200 includes a radio transceiver 202, a low band signal amplifier circuit 204-1, a mid-high band signal amplifier circuit 204-2, an ultra-high band signal amplifier circuit 204-3, four switches 206-1, 206-2, 206-3, 220, and four filters 208-1, 208-2, 208-3, 208-4. In some embodiments, the radio transceiver 202 converts the baseband signal to RF signal. In some embodiments, the low-band signal amplifier circuit 204-1 is used to amplify low-band RF signals, the mid-high band signal amplifier circuit 204-2 is used to amplify mid-high band RF signals, and the ultra-high band signal amplifier circuit 204-3 is used to amplify ultra-high band RF signals. The low-band signal amplifier circuit 204-1 is electrically connected between the radio transceiver 206 and the switch 206-1, the mid-high band signal amplifier circuit 204-2 is electrically connected between the radio transceiver 202 and the switch 206-2, and the ultra-high band signal amplifier circuit 204-3 is electrically connected between the radio transceiver 202 and the switch 206-3.

The switch 206-1 has one input end and four output ends. The input end of the switch 206-1 is electrically connected to the low-band signal amplifier circuit 204-1, the first output end of the switch 206-1 is electrically connected to the filter 208-1, the second output end of the switch 206-1 is electrically connected to the filter 208-2, the third output end of the switch 206-1 is electrically connected to the filter 208-3, and the fourth output end of the switch 206-1 is electrically connected to the filter 208-4. The switch 206-2 has one input end and four output ends. The input end of the switch 206-2 is electrically connected to the mid-high band signal amplifier circuit 204-2, and the four output ends are electrically connected to the filters 208-1, 208-2, 208-3, 208-4, respectively. The switch 206-3 has one input end and four output ends. The input end of the switch 206-3 is electrically connected to the ultra-high band signal amplifier circuit 204-3, and the four output ends are electrically connected to the filters 208-1, 208-2, 208-3, 208-4, respectively.

In some embodiment, each of the filters 208-1, 208-2, 208-3, 208-4 includes a low band filter (not shown), a mid-high band filter (not shown), and an ultra-high band filter (not shown). The filter 208-1 is electrically connected to the RF antenna 212-1. The filter 208-2 is electrically connected to the RF antenna 212-2. The filter 208-3 is electrically connected to the RF antenna 212-3. The switch 220 has an input end and two output ends. The input end of the switch 220 is electrically connected to the filter 208-4. The first output end of the switch 220 is electrically connected to the RF antenna 212-4, and the second output end of the switch 220 is electrically connected to the RF antenna 212-5. In some embodiments, the wireless communication circuit 200 is installed in a transport device, like a car, but the present disclosure is not limited thereto. In some embodiments, the RF antennas 212-1, 212-2, 212-3, 212-4, 212-5 are placed at different locations in the transport device. For example, the RF antenna 212-1 is placed at the front bumper of the transport device, the RF antenna 212-2 is placed at the rear bumper of the transport device, the RF antenna 212-3 is placed at the left-side mirror, the RF antenna 212-4 is placed at the right-side mirror, and the RF antenna 212-5 is placed at the hood of the transport device.

In some embodiments, if the radio transceiver 202 wants to connect to the cellular network with the mid-high band RF signal, the switch 206-2 first connects its input end and its first output end. In other words, the radio transceiver 202 tries to establish connection with the cellular network through the RF antenna 212-1. When the radio transceiver 202 cannot connect to the cellular network through the RF antenna 212-1, the switch 206-2 then connects its input end and its second output end so the radio transceiver 202 can try to establish connection with the cellular network through the RF antenna 212-2. When the cellular network cannot be connected through the RF antenna 212-2, the switch 206-2 subsequently connects its input end and its third output end for the radio transceiver 202 to try connect to the cellular network through the RF antenna 212-3.

When the radio transceiver 202 cannot connect to the cellular network through the RF antenna 212-3, the switch 206-2 electrically connects it input end and its fourth output ends, and the switch 220 electrically connects its input end and its first output end. In other words, the radio transceiver tries to connect to the cellular network through the RF antenna 212-4. When no connection is established between the cellular network and the radio transceiver 202 through the RF antenna 212-4, the switch 206-2 electrically connects its input end and its fourth output end, and the switch 220 electrically connects its input end and the second output end so the radio transceiver 202 can try to connect to the cellular network through the RF antenna 212-5. If the radio transceiver 202 is connected to the cellular network through the RF antenna 212-5, the rescue message is sent by the radio transceiver 202 through the first switch 206-2, the second switch 220, and the RF antenna 212-5.

In some embodiments, the low-band signal amplifier circuit 204-1, the mid-high band signal amplifier circuit 204-2, and the ultra-high band signal amplifier circuit 204-3 are respectively placed in an independent chip. In some embodiments, a part of or all of the switch 206-1 is placed in the independent chip with the low-band signal amplifier circuit 204-1, but the present disclosure is not limited thereto. Likewise, a part or all of the switch 206-2 is placed in the independent chip having the mid-high band signal amplifier circuit 204-2, and a part or all of the switch 206-3 is placed in the independent chip having the ultra-high band signal amplifier circuit 204-3.

The wireless communication circuit 100, 200 of the present disclosure can realize automatic selection among multiple antenna paths for connecting to the cellular network in an emergency condition, thereby increasing accident rescue and assistance efficiency and successful rate. The wireless communication circuit 100, 200 of the present disclosure is applicable in all types of emergency assistance system, wireless signal real-time broadcasting system, unmanned driving system, and any system that needs the wireless signal to be safe and secured. The wireless communication circuit 100, 200 of the present disclosure is described with five antenna paths but in theory more path selections can be realized.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wireless communication circuit suitable for being arranged in a transport device, the wireless communication circuit comprising:
   a radio transceiver, for converting a baseband signal to a radio frequency signal and determining whether a cellular network has been connected;
   a signal amplifier circuit, electrically connected to the radio transceiver and for amplifying the radio frequency signal;
   a plurality of filters for filtering the radio frequency signal; and
   a first switch, comprising an input end and a plurality of output ends and electrically connected between the signal amplifier circuit and the plurality of filters;
   wherein the first switch connects the input end and one of the plurality of output ends until the radio transceiver determines that the cellular network has been connected, and the radio transceiver sends a rescue message through the first switch.

2. The wireless communication circuit according to claim 1, wherein the input end of the first switch is electrically connected to the signal amplifier circuit, and the plurality of output ends of the first switch are connected to the plurality of filters.

3. The wireless communication circuit according to claim 1, further comprising:
   a second switch comprising a second input end and a plurality of second output ends;
   wherein the second input end is electrically connected to one of the plurality of filters.

4. The wireless communication circuit according to claim 3, wherein, when the first switch connects the input end and another one of the plurality of output ends, the second switch connects the second input end and one of the plurality of second output ends in sequence until the radio transceiver determines the cellular network has been connected.

5. The wireless communication circuit according to claim 1, further comprising
   a baseband processor for converting a digital signal to the baseband signal and transmitting the baseband signal to the radio transceiver.

6. The wireless communication circuit according to claim 1, wherein the radio transceiver receives and decodes a global navigation satellite system signal to obtain a location information of the transport device, and sends the rescue message with the location information embedded therein.

7. The wireless communication circuit according to claim 3, wherein the transport device comprises a plurality of RF antennas and a positioning antenna, a portion of the plurality of RF antennas are electrically connected to the plurality of filters, and another portion of the plurality of RF antennas are electrically connected to the plurality of second output ends of the second switch.

8. The wireless communication circuit according to claim 7, wherein the radio transceiver receives a global navigation satellite system signal through the positioning antenna.

9. The wireless communication circuit according to claim 1, wherein the transport device comprises a microcontroller and a sensor unit, when the transport device is in a collision, the sensor unit sends a control signal to the microcontroller.

10. The wireless communication circuit according to claim 9, wherein the microcontroller sends an activation command to the radio transceiver based on the control signal, and the wireless radio transceiver begins determining whether the cellular network has been connected.

11. The wireless communication circuit according to claim 1, wherein the plurality of filters are low-band (LB) filters, medium-high-band (MHB) filters, or ultra-high-band (UHB) filters.

12. A transport device comprising:
    a radio transceiver for converting a baseband signal to a radio frequency signal and determining whether a cellular network has been connected;
    a signal amplifier circuit electrically connected to the radio transceiver for amplifying the radio frequency signal;
    a plurality of filters for filtering the radio frequency signal;
    a first switch, comprising an input end and a plurality of output ends, and electrically connected between the signal amplifier circuit and the plurality of filters;
    a second switch, comprising a second input end and a plurality of second output ends, wherein the second input end is electrically connected to one of the plurality of filters;
    a plurality of radio frequency antennas, wherein a portion of the plurality of radio frequency antennas are electrically connected to the plurality of filters, and another portion of the plurality of RF antennas are electrically connected to the plurality of second output ends of the second switch;
    a sensor unit for sensing whether the transport device is in a collision; and
    a microcontroller;
    wherein the first switch connects the input end and one of the plurality of output ends in sequence until the radio transceiver determines the cellular network has been connected, and the radio transceiver sends a rescue message through the first switch and one of the plurality of radio frequency antennas;
    wherein, when the transport device is in a collision, the sensor unit sends a control signal to the microcontroller, the microcontroller sends an activation command to the radio transceiver based on the control signal, and the radio transceiver begins determining whether the cellular network has been connected.

13. The transport device according to claim 12, wherein, when the first switch connects the input end and another one of the plurality of output ends, the second switch connects the second input end and one of the plurality of second output ends in sequence until the radio transceiver determines the cellular network has been connected, and the radio transceiver sends the rescue message through the first switch, the second switch, and another one of the plurality of RF antennas.

14. The transport device according to claim 12, wherein the input end of the first switch is electrically connected to the signal amplifier circuit, and the plurality of output ends of the first switch are electrically connected to the plurality of filters.

15. The wireless communication circuit according to claim 12, further comprising: a baseband processor for converting a digital signal to the baseband signal and transmitting the baseband signal to the radio transceiver.

16. The transport device according to claim 12, further comprising:
- a positioning antenna, wherein the radio transceiver receives a global navigation satellite system signal through the positioning antenna and decodes the global navigation satellite system signal to obtain a location information of the transport device;
- wherein the radio transceiver sends the rescue message with the location information embedded therein.

* * * * *